United States Patent [19]

Jones

[11] Patent Number: 4,714,087
[45] Date of Patent: Dec. 22, 1987

[54] FUEL ADDITIVE PROPORTIONING APPARATUS AND METHOD

[76] Inventor: Jamieson B. Jones, 188 Drum Hill Rd., Wilton, Conn. 06897

[21] Appl. No.: 31,510

[22] Filed: Mar. 27, 1987

[51] Int. Cl.⁴ .......................................... G05D 11/03
[52] U.S. Cl. .......................................... 137/3; 137/98; 137/114; 137/892; 137/895; 251/902
[58] Field of Search ................. 137/3, 98, 101.11, 114, 137/888, 892, 895; 222/57; 251/902

[56] References Cited

U.S. PATENT DOCUMENTS

| | | | |
|---|---|---|---|
| 125,937 | 4/1872 | Cowles . | |
| 1,167,386 | 1/1916 | Crusius . | |
| 1,760,315 | 5/1930 | Nacket | 251/902 |
| 2,592,304 | 4/1952 | Lubeley | 137/165 |
| 2,757,047 | 7/1956 | Friedmann | 137/892 X |
| 2,826,211 | 3/1958 | Reed | 137/98 |
| 2,849,014 | 8/1958 | Pressler et al. | 137/98 |
| 3,547,002 | 3/1972 | Lindsay | 169/16 |
| 4,069,835 | 1/1978 | Stadler | 137/114 |
| 4,173,178 | 11/1979 | Wieland | 137/599.1 X |
| 4,319,606 | 3/1982 | Hoogenboom | 137/625.3 |
| 4,354,516 | 10/1982 | Newell | 137/98 |
| 4,671,309 | 6/1987 | Iemura | 137/93 |

Primary Examiner—Robert G. Nilson
Attorney, Agent, or Firm—St. Onge Steward Johnston & Reens

[57] ABSTRACT

Apparatus and a method is provided for delivering a fuel additive to fuel flowing through a pump from an upstream side to a discharge side thereof for delivery to a dispenser with fuel flow through the pump and dispenser being controlled by a dispensing valve. The apparatus comprises a flow sensitive valve positioned upstream of said pump within the fuel flow and being arranged to open in response to fuel flow and close in response to absence of said fuel flow, conduit means in liquid flow communication with the discharge side of said pump to feed back fuel through said valve to fuel at said upstream side of said pump, and means disposed in said conduit means and responsive to the feedback flow of fuel through said conduit means for discharging fuel additive into said conduit for delivery through said flow sensitive valve into said fuel flow on the upstream side of said pump.

25 Claims, 4 Drawing Figures

FUEL ADDITIVE PROPORTIONING APPARATUS AND METHOD

BACKGROUND OF THE INVENTION

A. The Field of the Invention

The field of the present invention concerns apparatus and a method for delivering an additive liquid into a fuel flow during the time when the fuel is pumped from a supply tank to a holding tank.

B. Prior Art

Mixing of an additive to a home heating fuel has been practised for some time. Typically such additive is mixed during the time when the fuel is unloaded from a supply tank into a holding tank. This can take place at the depot when a tank truck is being loaded, or at the consumer's holding tank when the truck is being unloaded. The additive is supplied in very small amounts, typically in a proportion of one part additive to 3000 parts of fuel oil.

For example, an additive known as Actene A sold by Aetna Chemical Corporation is routinely added to fuel oil to improve burnability of the fuel oil, improve efficiency of the oil burner, reduce maintenance problems, and protect oil tanks from bacteria that coagulate fuel. This additive is relatively expensive and is desirably added in relatively small amounts to the fuel oil as the oil is being pumped from a source, such as a tank truck, to a commercial or consumer's fuel storage tank. For example, if fuel is being transferred from a tank truck to a storage tank at a flow rate of 70 gallons per minute, the additive is desirably added at the approximate rate of 0.02 gallons per minute.

Fuel pumping systems for the introduction of such additives are known in the art. One prior art device uses a turbine wheel arranged in the fuel oil flow as it is pumped from a source to a storage tank. This turbine wheel operates a pump, which in turn pumps additive into the fuel flow. Another prior art device uses a small piston pump driven by the pressure drop across a meter placed in the supply line. Additive is then pumped into the fuel in response to fuel flow through the meter.

These prior art pumping systems typically used for fuel oil systems are disadvantageous in that they have a tendency to clog, are expensive to install and maintain, do not perform well in cold weather, and are difficult to adjust so that a controlled amount of additive is introduced into the fuel at a fairly constant proportion regardless of the fuel flow rate.

Fluid proportioning devices are also known generally in the prior art. For example, U.S. Pat. No. 2,592,304 to Lubeley shows a device for proportioning the feed of one fluid into mixture with another fluid. U.S. Pat. No. 2,826,211 to Reed discloses apparatus for introducing additives into gasoline and other liquid fuels. U.S. Pat. No. 2,849,014 to Pressler et al. discloses an apparatus said to be capable of regularly discharging a small flow of liquid into a pipe or other channel in which there is a relatively large flow of liquid of a different kind and which will maintain the percentage or ratio of the two liquids substantially constant. Other such apparatus are disclosed in U.S. Pat. No. 3,647,002 to Lindsay and U.S. Pat. No. 4,354,516 to Newell.

U.S. Pat. No. 4,319,606 to Hoogenboom shows a fluid pressure regulator valve in which a spring valve is levered open and closed by an electromagnetic control coil. U.S. Pat. No. 1,760,315 to Nacket discloses a device using a spring valve said to provide airdilution of a gaseous mixture flowing through a manifold when the gaseous mixture stream has achieved sufficient velocity to deflect a spring valve.

SUMMARY OF THE PRESENT INVENTION

An additive delivery system in accordance with the present invention is simple, inexpensive, readily installed, reliable, and precise enough for use with a fuel oil pumping system. This is achieved in accordance with one additive delivery system in accordance with the invention by drawing a small portion of the fuel from the high pressure discharge side of the fuel pump on a delivery truck and returning the small portion in a feedback path through an aspirator and a flow sensitive valve to the low pressure upstream side of the pump. The aspirator is connected to a supply of additive so that this can be delivered through the feedback path in the right proportion into the fuel as this flows through the pump during a fuel delivery.

With an additive delivery system in accordance with the invention, inadvertent spillage of relatively expensive additive is conveniently inhibited since its access to the fuel is through a biased closed valve or such a valve and a small restricted orifice. This biased closed valve also inhibits the fuel in the main tank from leaking back through the additive supply and possibly into the environment.

The additive is accurately delivered to the fuel and its small proportion of the fuel flow can be advantageously precisely set within a range that extends to as small as 1 to 10,000. Additive is, furthermore, supplied only when fuel is actually delivered, so that no additive is wasted while the fuel pump is still operating after the operator has closed the valve at the end of the fuel delivery hose.

It is therefore an object of the present invention to provide an apparatus for delivering a small amount of additive liquid into a primary liquid flow such as fuel oil pumped from a delivery truck in an efficient, reliable, and controllable manner.

It is a further object of the present invention to provide such apparatus which can be easily and simply installed on existing fuel pumping systems.

Further objects and advantages of the present invention will become apparent from the following description of the drawings and the preferred embodiment.

DETAILED DESCRIPTION OF THE PREFERRED EMBODIMENT

Figure 1:
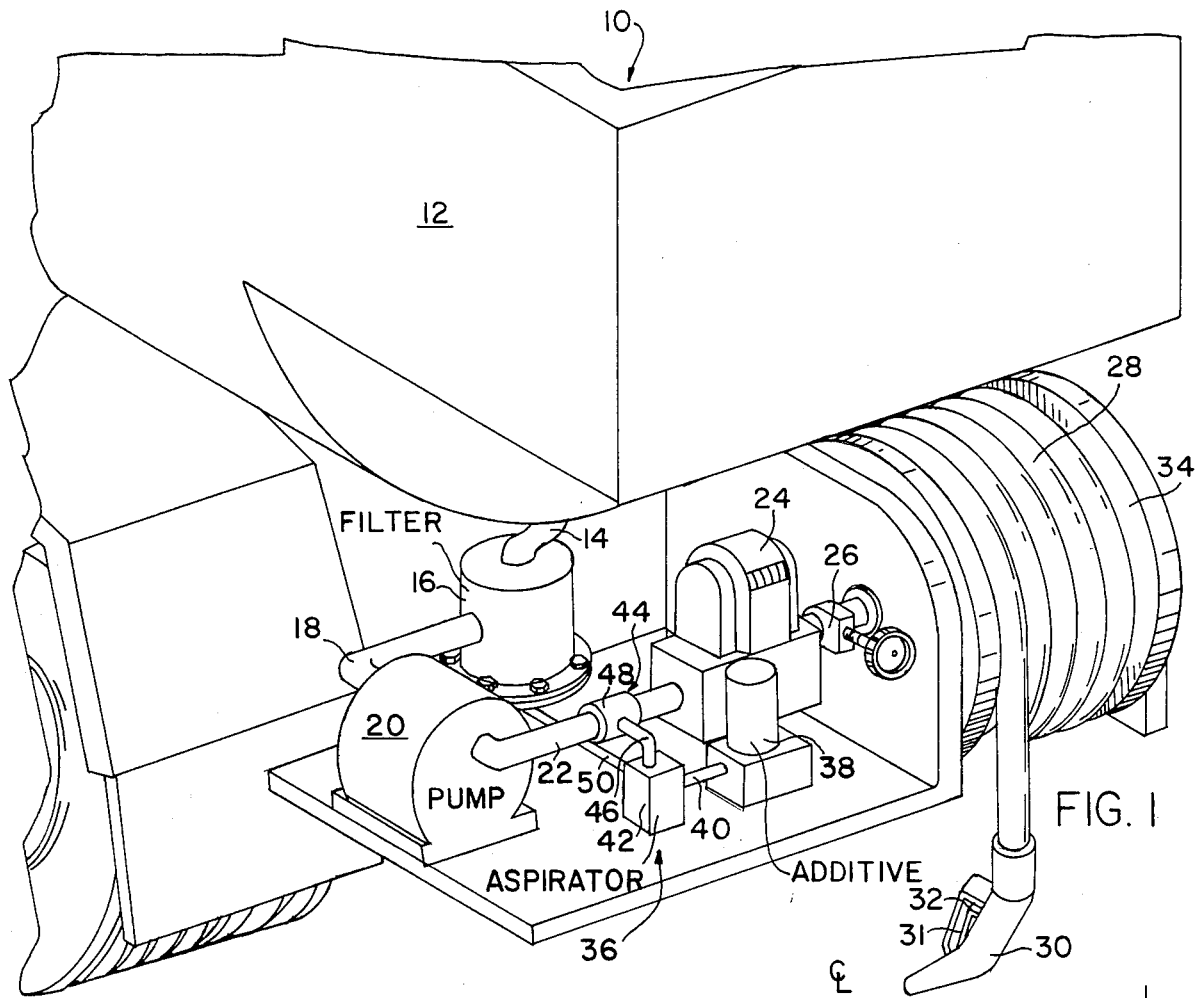
FIG. 1 is a perspective view of a fuel delivery truck carrying an additive delivery apparatus in accordance with the present invention as it is installed in the pumping system of the truck.

With reference to FIG. 1, the rear portion of a fuel tank truck 10 is shown having a tank 12 for transport and delivery of fuel oil, usually to a consumer's storage tank. The fuel delivery path to the storage tank (not shown) is through a tank drain pipe 14, a filter assembly 16, supply line 18 on the upstream side of a pump 20, and thereafter through a pump discharge line 22, a meter 24, a main cut off valve 26, to a hose 28, and nozzle 30. It is understood that the apparatus of the present invention is not limited to being mounted on a tank truck, but can just as easily be used at a fuel depot where fuel is transferred from a depot tank into a tank truck.

Nozzle 30 includes a normally biased closed nozzle valve 31 operated by lever 32 to control fuel flow.

In a typical operation, the operator activates pump 20 and opens valve 26. The pump 20 receives oil under relatively low or atmospheric pressure from tank 12 through pipe 14, filter 16, and supply line 18 and immediately attempts to deliver oil under higher pressure through discharge line 22 to nozzle 30. The operator then extends a sufficient length of hose 28 from hose storage reel 34 to the consumer's oil storage tank. Nozzle 30 is placed in the tank, nozzle valve 32 is opened, and pump 20 begins delivering oil from tank 12 through nozzle 30.

While the fuel oil is flowing an additive delivery apparatus 36 adds liquid additive into the fuel from an additive supply 38. Additive flows through a conduit 40 into a non-positive displacement pump such as an aspirator or jet pump 42 located within a feedback path, generally indicated at 44 leading from the high pressure downstream side of pump 20 at conduit 46 to the low pressure upstream side of pump 20 inside filter 16. The feedback path 44 includes a conduit 46 connected to pipe 22 at junction 48 and a conduit 50 that leads to filter 16. Pump 42 is of a type capable of delivering additive in proportion to the amount of fuel flowing through feedback path 44.

Figure 2:
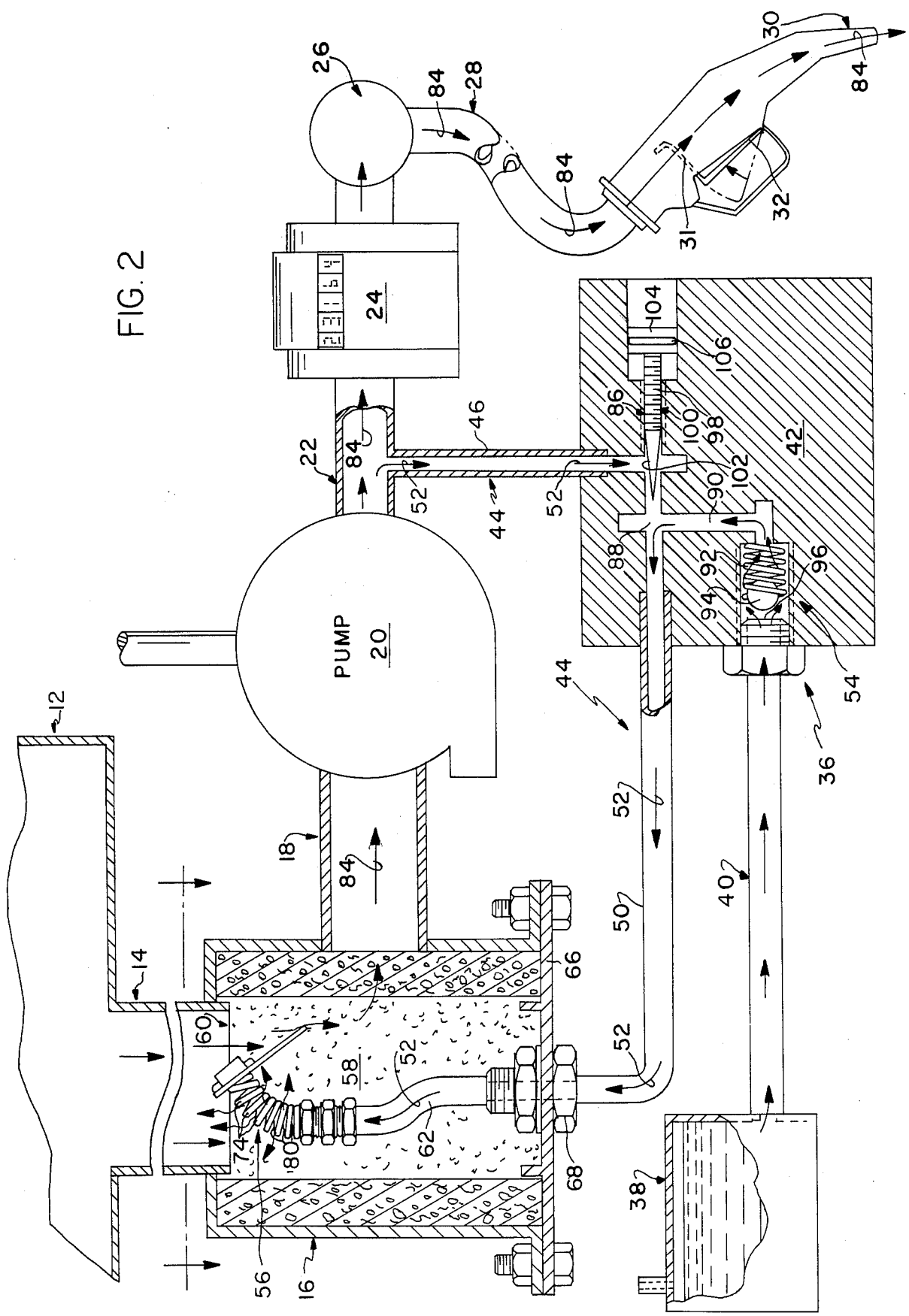
FIG. 2 is a schematic representation of the additive delivery apparatus of FIG. 1 in cooperation with a conventional fuel pumping system.

As shown in more detail in FIG. 2, the additive delivery apparatus 36 provides additive into feedback path 44 by which a small portion or fraction of high pressure fuel oil flows as indicated by arrows 52 from the discharge side or line 22 of pump 20 through aspirator 42 and through conduit 50 to filter assembly 16 at the upstream side of pump 20. The fuel fraction being fed back through path 44 is preferably quite small, on the order of less than 1% of the fuel flow in line 22.

A supply 38 of fuel additive under atmospheric pressure provides additive through pipe 40 to aspirator 42, which aspirates additive past a check valve 54 in a controlled manner into conduit 50 for delivery through a flow sensitive valve 56 inside a central chamber 58 of filter 16.

Figure 3:
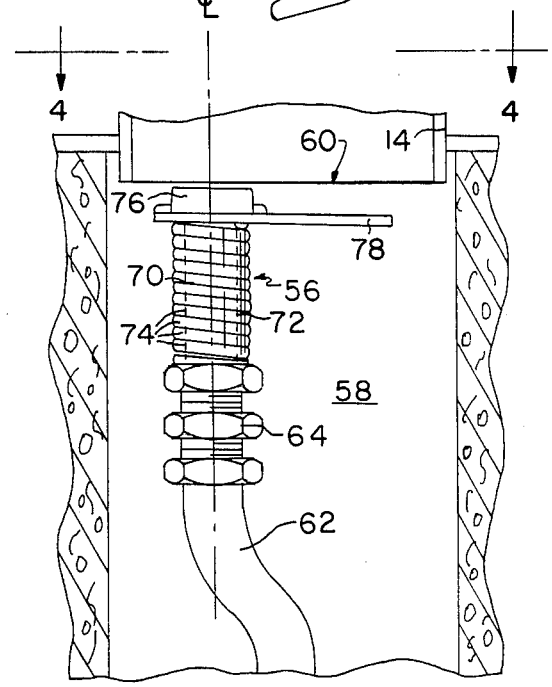
FIG. 3 is a side partially cutaway view of a flow sensitive valve used in the present invention.

With additional reference to FIGS. 3 and 4, conduit 50 terminates at flow sensitive valve 56 which is operatively positioned directly below the discharge end 60 of fuel drain pipe 14. Valve 56 is supported by a tube 62 through a coupling 64 and is connected to conduit 50 at the bottom plate 66 of filter 16 by a suitable coupling 68.

Flow sensitive valve 56 is formed with a helically coiled spring 70 surrounding a valve chamber indicated by dotted lines 72. Spring 70 is formed by a plurality of coils 74 that normally compress into engagement with each other in axial alignment as shown in FIG. 3 to close the sides of chamber 72. One axial end of chamber 72 is in liquid communication with the feedback path 44 through tube 62 and the other axial end is closed by a bolt 76 that meshes with coils 74 and mounts a valve actuating flapper 78 to an end of spring 70.

Flapper 78 is positioned to resist or encounter fuel flow through drain pipe 14 into chamber 58 of filter 16. Flapper 78 is sized and placed so as to pivot in response to fuel flowing through nozzle 30. As shown in FIG. 2, this causes the plurality of coils 74 to spread apart and thus enable additive to enter filter chamber 58 through spaces 80.

Figure 4:
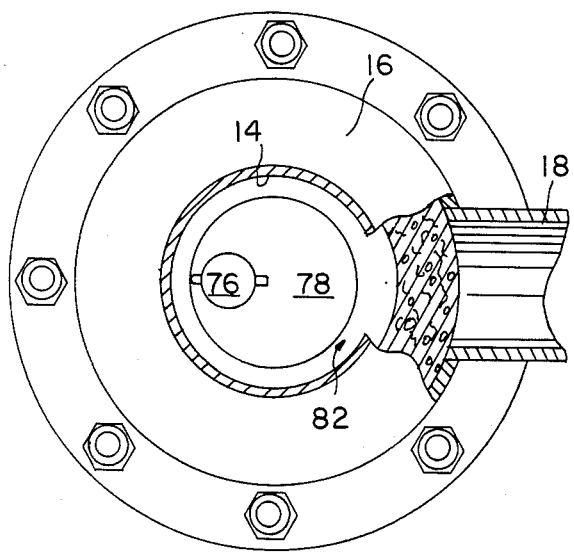
FIG. 4 is a top partially cutaway view of the flow sensitive valve of FIG. 3.

As illustrated in FIG. 4, which shows a top view along the lines 4—4, flapper 78 obstructs a substantial portion of the cross section of drain pipe 14, while leaving a peripheral annular shaped space 82 for limited unobstructed fuel flow without deflecting flapper 78. At larger flow rates, such as when nozzle valve 31 is opened and pump 20 is pumping fuel out through hose 28 and nozzle 30 as shown by arrows 84, flapper 78 is deflected as shown in FIG. 2.

The flow sensitive valve 56 is positioned to a side, or off-axis, of chamber 58 and drain 14 to enable flapper 78 to respond to fuel flow.

While nozzle 30 is open, the relatively high pressure in conduit 22 enables a small portion of the fuel to flow through conduit 46 past a flow adjustor 86 in aspirator 42. This provides a high feedback fuel flow at a substantially reduced pressure in the region 88, where an additive channel 90 terminates. Because the pressure in region 88 is less than the substantially atmospheric pressure to which the additive in supply 38 is subjected, additive is forced through pipe 40 and past ball-check valve 54, through channel 90, into region 88 where the additive is carried by the fuel feedback flow through flow sensitive valve 56 into the low pressure upstream side of pump 20.

Ball check valve 54 includes a spring 92 that urges a ball 94 against a valve seat 96 to close valve 54 when the pressure exerted by additive in line 40 is less than the fuel pressure in region 88. Valve 54 also inhibits fuel from tank 12 from bleeding back through conduit 46, aspirator 42, pipe 40, source 38, and out through the vent in source 38 into the environment.

When an operator has completed fuel oil delivery and allows nozzle valve 31 to close, pump 20 is still running. Flow sensitive valve 56, however, tends to close, thereby allowing a back pressure to build up in feedback conduits 46 and 50. This in turn sufficiently raises the pressure at the aspirating region 88 to enable ball check valve 54 to close so that additive will not be further aspirated even if some oil continues to flow through the feedback path 44 through a leaky valve 56.

Aspirator 42 has a needle-shaped flow adjustor 86 with a screw thread 98 that meshes with a threaded channel 100. The inwardly or outwardly positioned needle-shaped tip 102 enables control over the fuel flow rate and velocity at region 88. Hence, by turning the screw head 104 of adjustor 86 the amount of additive aspirated at region 88 can be controlled or set as desired. A suitable seal 106 can be incorporated at head 104 to prevent leakage.

It is understood that the present invention need not be limited to the delivery of fuel oil additive into fuel oil, but that other additive liquids than a fuel oil additive can be so controlled and added to a primary or main liquid flow by using the principles and aspects of this invention. Accordingly, this invention may have utility in chemical processing equipment or the proportioning of any secondary liquid into a primary liquid flow.

It should be understood that various changes and modifications to the preferred embodiments described above may be apparent to those skilled in the art. Such changes and modifications can be made without departing from the spirit and scope of the present invention, and it is therefore intended that such changes and modifications be covered by the following claims.

I claim:

1. An apparatus for delivering a fuel additive from a supply into fuel pumped from a fuel tank by a pump through a line having a normally closed line valve, comprising:
   (a) a normally closed flow sensitive valve positioned upstream of said pump within the flow of fuel, said flow sensitive valve being arranged to open only in response to fuel flow attributable to the opening of said line valve;
   (b) conduit means providing a fuel feedback path from the discharge side of said pump to its upstream side through said flow sensitive valve; and
   (c) means interposed with said conduit means for discharging into said conduit means an adjustable amount of fuel additive in response to the flow of fuel through the conduit means for delivery through the flow sensitive valve into fuel flow that is upstream of said pump.

2. The apparatus of claim 1, wherein said flow sensitive valve has a flapper disposed in said fuel flow to open said flow sensitive valve to deliver additive only when fuel is flowing.

3. The apparatus of claim 2, wherein said flow sensitive valve comprises a spring valve operatively coupled to said flapper.

4. The apparatus of claim 3, wherein said additive discharging means comprises aspirator means having a first inlet port coupled to the discharge side of the pump and an outlet port coupled to the conduit means, said aspirator means further providing an additive supply conduit for discharging fuel additive between the inlet and outlet ports of the aspirator means, and means operatively placed between the additive supply conduit and the discharge side of the aspirator means for adjustably controlling the amount of additive discharged into said conduit means.

5. The apparatus of claim 4, wherein said aspirator means further comprises a normally biased closed check valve operatively interposed with the additive supply conduit to close the additive supply conduit in response to the rise in pressure in said conduit means in response to the closing of said flow sensitive valve.

6. The apparatus as claimed in claim 5, wherein the fuel delivered from the tank is passed through a drainpipe into a filter at the upstream side of the pump, said filter having a central chamber in fuel flow communication with the drain pipe; and wherein
said flow sensitive valve is placed within said filter chamber.

7. The apparatus as claimed in claim 6 wherein the flow sensitive valve has an actuating flapper disposed to generally resist the flow of fuel through the drainpipe and is located off-axis relative to the central axis of the filter chamber.

8. The apparatus as claimed in claim 7 wherein the flow sensitive valve is formed of a generally cylindrically shaped helical spring, said spring being formed of a plurality of normally compressed coils that engage one another at annular perimeters around a valve chamber, said valve chamber being coupled for fluid flow communication at one axial end to said conduit means and means for sealing the other axial end of said valve chamber.

9. An apparatus for delivering a fuel additive from a supply into fuel pumped from a fuel delivery truck by a pump through a hose terminated at a nozzle having a normally closed nozzle valve, comprising:
   (a) a normally closed flow sensitive valve positioned upstream of said pump within the flow of fuel, said flow sensitive valve being arranged to open only in response to fuel flow attributable to the opening of said nozzle valve;
   (b) conduit means providing a fuel feedback path from the discharge side of said pump to its upstream side through said flow sensitive valve; and
   (c) means interposed with said conduit means for discharging into said conduit means an adjustable amount of fuel additive in response to the flow of fuel through the conduit means for delivery through the flow sensitive valve into fuel flow that is upstream of said pump.

10. The apparatus of claim 9, wherein said flow sensitive valve has a flapper disposed in said fuel flow to open said flow sensitive valve to deliver additive only when fuel is flowing.

11. The apparatus of claim 10, wherein said flow sensitive valve comprises a spring valve operatively coupled to said flapper.

12. The apparatus of claim 11, wherein said additive discharging means comprises aspirator means having a first inlet port coupled to the discharge side of the pump and an outlet port coupled to the conduit means, said aspirator means further providing an additive supply conduit for discharging fuel additive between the inlet and outlet ports of the aspirator means, and means operatively placed between the additive supply conduit and the discharge side of the aspirator means for adjustably controlling the amount of additive discharged into said conduit means.

13. The apparatus of claim 12, wherein said aspirator means further comprises a normally biased closed check valve operatively interposed with the additive supply conduit to close the additive supply conduit in response to the rise in pressure in said conduit means in response to the closing of said flow sensitive valve.

14. The apparatus as claimed in claim 9, wherein the fuel delivered by the truck is passed through a drainpipe into a filter at the upstream side of the pump, said filter having a central chamber in fuel flow communication with the drain pipe; and wherein
said flow sensitive valve is placed within said filter chamber.

15. The apparatus as claimed in claim 14 wherein the flow sensitive valve has an actuating flapper disposed to generally resist the flow of fuel through the drainpipe and is located off-axis relative to the central axis of the filter chamber.

16. The apparatus as claimed in claim 15 wherein the flow sensitive valve is formed of a generally cylindrically shaped helical spring, said spring being formed of a plurality of normally compressed coils that engage one another at annular perimeters around a valve chamber, said valve chamber being coupled for fluid flow communication at one axial end to said conduit means and means for sealing the other axial end of said valve chamber.

17. Apparatus for delivering a secondary liquid from a supply thereof to primary liquid flowing through a pump from an upstream side to a discharge side thereof for delivery to a dispenser with primary liquid flow through the pump and dispenser being controlled by a dispensing valve, said apparatus comprising:
   (a) a flow sensitive valve positioned upstream of said pump within the primary liquid flow, said flow sensitive valve being arranged to open in response to primary liquid flow and to close in response to absence of said primary liquid flow;

(b) conduit means in liquid flow communication with the discharge side of said pump to feed back primary liquid through said flow sensitive valve to primary liquid at said upstream side of said pump; and (c) means disposed in said conduit means and responsive to the feedback flow of primary liquid through said conduit means for discharging secondary liquid into said conduit for delivery through said flow sensitive valve into said primary liquid flow on the upstream side of said pump, whereby said secondary liquid is delivered to said primary liquid upstream of said pump only when said dispensing valve is opened to dispense primary liquid.

18. The apparatus of claim 17, wherein said flow sensitive valve comprises a helically coiled spring surrounding a valve chamber and having coils which normally compress into engagement with each other to close the sides of said valve chamber, one end of said valve chamber being in liquid communication with the conduit means, and flapper means attached to another end of the valve chamber and positioned to resist primary liquid flow for flexing said spring in response to primary liquid flow and thereby opening the valve chamber to admit secondary liquid from the conduit means into the primary liquid flow.

19. The apparatus of claim 18, further including means for delivering primary liquid from the discharge side of the pump at a reduced pressure to said secondary liquid discharging means, said discharging means comprising aspirator means placed in said conduit means and in liquid flow communication with the supply of secondary liquid to effect the discharge of said secondary liquid into said conduit means.

20. The apparatus of claim 19, wherein said pressure reducing means is sized to provide a portion of said primary liquid flow from said discharge side to said upstream side, and said aspirator means is inserted in said conduit means and further comprises an input port and an output port connecting said aspirator means serially into said conduit means, and said aspirator means further comprises a secondary liquid inlet port for discharging secondary liquid into said conduit means between said input and output ports in response to said primary liquid flow therethrough from the input port to the output port for delivery through said flow sensitive valve into the primary liquid flow.

21. The apparatus of claim 19, wherein said aspirator means further comprises means for adjusting the amount of secondary liquid discharged.

22. The apparatus of claim 21, wherein the aspirator means further comprises a check valve oriented so as to close in response to pressure rise in the primary liquid feedback flow due to a closure of the flow sensitive valve.

23. A method for delivering a fuel additive to a fuel flowing through a pump from an upstream side to a discharge side thereof for flow through a dispenser controlled by a dispensing valve, the method comprising:

(a) passing a portion of the fuel from said discharge side along a bypass path through a flow control back to said upstream side, said flow control permitting flow therethrough only when fuel is being discharged through said dispensing valve; and (b) in response to fuel flow through said flow control, supplying a controlled amount of said fuel additive into said fuel portion in said bypass path, whereby said additive is supplied only when fuel is being discharged through said dispensing valve.

24. The method of claim 23, wherein said supplying step further comprises the step of aspirating said additive into said fuel portion in response to the flow of fuel through said flow control and terminating said aspiration when flow through said flow control is terminated.

25. The method of claim 24, wherein said aspirating step comprises the step of adjusting the flow rate of said fuel portion to select the rate of flow of additive into said fuel portion.

* * * * *